US009460182B2

(12) United States Patent
Song et al.

(10) Patent No.: US 9,460,182 B2
(45) Date of Patent: Oct. 4, 2016

(54) NETWORKING-ASSISTED INPUT/OUTPUT ORDER PRESERVATION FOR DATA REPLICATION

(71) Applicant: International Business Machines Corporation, Armonk, NY (US)

(72) Inventors: Yang Song, San Jose, CA (US); Ramani R. Routray, San Jose, CA (US); David R. Blea, Round Rock, TX (US); Kavita Chavda, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 14/220,713

(22) Filed: Mar. 20, 2014

(65) Prior Publication Data

US 2015/0269238 A1      Sep. 24, 2015

(51) Int. Cl.
  *G06F 15/16* (2006.01)
  *G06F 17/30* (2006.01)
  *H04L 29/08* (2006.01)

(52) U.S. Cl.
  CPC ..... *G06F 17/30578* (2013.01); *H04L 67/1095* (2013.01); *G06F 17/30174* (2013.01)

(58) Field of Classification Search
  CPC ................... H04L 67/1095; G06F 17/30578; G06F 17/30174
  See application file for complete search history.

(56) References Cited

U.S. PATENT DOCUMENTS

| | | | |
|---|---|---|---|
| 6,820,098 B1 * | 11/2004 | Ganesh | G06F 11/2074 |
| 7,058,853 B1 * | 6/2006 | Kavanappillil | G06F 11/1471 709/213 |
| 7,194,487 B1 * | 3/2007 | Kekre | G06F 11/2064 |
| 7,287,043 B2 * | 10/2007 | Lindsay | G06F 17/30578 |
| 7,464,126 B2 | 12/2008 | Chen | |
| 7,475,207 B2 | 1/2009 | Bromling et al. | |
| 7,577,867 B2 * | 8/2009 | Lewin | G06F 11/1471 714/15 |
| 8,255,367 B2 | 8/2012 | Miyamae | |
| 8,285,956 B2 * | 10/2012 | Ozdemir | G06F 11/2066 711/162 |
| 8,413,216 B2 | 4/2013 | Hughes et al. | |
| 8,442,950 B2 | 5/2013 | D'Souza et al. | |
| 8,468,313 B2 * | 6/2013 | Yim | G06F 11/2064 711/162 |
| 8,522,225 B2 | 8/2013 | Chen | |
| 8,600,935 B1 * | 12/2013 | Dantkale | G06F 17/30073 707/624 |
| 8,938,420 B1 * | 1/2015 | Thakur | G06F 17/30144 707/615 |
| 9,063,994 B1 * | 6/2015 | Natanzon | G06F 17/30575 |
| 9,235,481 B1 * | 1/2016 | Natanzon | G06F 11/14 |
| 2011/0099342 A1 * | 4/2011 | Ozdemir | G06F 11/2066 711/162 |
| 2013/0194914 A1 | 8/2013 | Agarwal et al. | |
| 2014/0040206 A1 * | 2/2014 | Ramakrishnan | G06F 11/2097 707/640 |

* cited by examiner

*Primary Examiner* — Moustafa M Meky
(74) *Attorney, Agent, or Firm* — Ryan, Mason & Lewis, LLP (57) ABSTRACT

Methods, systems, and articles of manufacture for networking-assisted I/O order preservation for data replication are provided herein. A method includes identifying, from one or more devices at a primary site, (i) each of multiple data changes and (ii) input/output chronological order information associated with the multiple data changes; determining one or more forwarding rules to be implemented in connection with delivering a command associated with each of said multiple data changes to one or more devices at a secondary site, wherein said forwarding rules are based on said input/output chronological order information; and delivering the command associated with each of said multiple data changes to one or more devices at the secondary site in accordance with said one or more forwarding rules to maintain a chronological order of the multiple data changes from the primary site to the secondary site.

17 Claims, 4 Drawing Sheets

FIG. 1

TCP/IP Packet 1

TCP/IP Packet 2

TCP/IP Packet 3

TCP/IP Packet 4

NETWORKING-ASSISTED INPUT/OUTPUT ORDER PRESERVATION FOR DATA REPLICATION

FIELD OF THE INVENTION

Embodiments of the invention generally relate to information technology (IT), and, more particularly, to data replication.

BACKGROUND

In enterprise data centers, data replication is commonly an important IT operation that ensures continuity in case of data loss and/or device failures. In such a context, a primary site maintains an original copy of data, while a secondary site is established comprising one or more storage devices to maintain the replica of portions (or all) of the data maintained at the primary site.

Typical data replication approaches can be categorized into two classes: (i) synchronous replication and (ii) asynchronous replication. Synchronous replication approaches require that both the primary site and the secondary site commit the input/output (I/O) operation before an I/O success acknowledgement is sent back to the host. In contrast, in asynchronous replication approaches, the primary site will send an I/O success acknowledgment back to the host immediately after a local commitment, and the primary site will additionally synchronize with the secondary site in regards to the new I/O change afterwards. Therefore, synchronous replication schemes are well-suited for scenarios wherein the network latency between the primary site and the secondary site is small, whereas asynchronous replications are commonly used for long distance secondary sites over wide area networks (WAN) or the Internet.

For many applications, the order of the I/O requests is a separate important factor that must be preserved for application-level data consistency. One example scenario includes a database application which writes data (for example, table updating) in one storage volume, and writes logs in another storage volume. For application-level data consistency, the database application needs to first write to the log volume before writing the actual data into the data volume, and such an I/O order must be preserved at the replicas located in the secondary site. In other words, during data replication, the I/O must be applied on the log replica volume first, before performing the write I/O on the data replica volume, in order to satisfy the specific application data consistency requirement.

One example existing approach for keeping track of the order of I/O requests includes creating a "consistency group," which includes multiple storage volumes (in the primary site), and the data replication goal for this "consistency group" is to duplicate the I/O changes to the storage devices as well as the order of such changes to the replicas in a secondary site. However, for asynchronous data replications, for example, preserving such an I/O order across multiple storage volumes presents challenges. The challenges are further complicated in instances wherein the primary site uses transmission control protocol/internet protocol (TCP/IP) based protocols such as Internet Small Computer System Interface (iSCSI) and Fiber Channel over IP (FCIP) to transmit data replication over a WAN such as the Internet, wherein TCP/IP packets (containing I/O commands) that are sequentially ordered at the primary site can arrive at the secondary site out of order due to multi-path routing and the unreliable nature of the Internet.

Accordingly, a need exists for I/O order preservation techniques in connection with data replication.

SUMMARY

In one aspect of the present invention, techniques for networking-assisted I/O order preservation for data replication are provided. An exemplary computer-implemented method can include steps of identifying, from one or more devices at a primary site, (i) each of multiple data changes and (ii) input/output chronological order information associated with the multiple data changes; determining one or more forwarding rules to be implemented in connection with delivering a command associated with each of said multiple data changes to one or more devices at a secondary site, wherein said one or more forwarding rules are based on said input/output chronological order information; and delivering the command associated with each of said multiple data changes to the one or more devices at the secondary site in accordance with said one or more forwarding rules to maintain a chronological order of the multiple data changes from the primary site to the secondary site.

In another aspect of the invention, an exemplary computer-implemented method can include steps of deploying a software agent at a primary site to collect information from one or more devices at the primary site, wherein said information comprises (i) each of multiple data changes and (ii) input/output chronological order information associated with the multiple data changes; and pushing said collected information as multiple data packets from said software agent to a software-defined networking controller. The method also includes determining one or more data packet forwarding rules associated with the software-defined networking controller, wherein said one or more forwarding rules are based at least on said input/output chronological order information associated with the multiple data changes. Further, the method additionally includes transferring the multiple data packets from the software-defined networking controller to one or more software-defined networking-enabled routing components at a secondary site; and delivering the multiple data packets from the one or more software-defined networking-enabled routing components to one or more devices at the secondary site during data replication between the primary site and the secondary site in accordance with said one or more data packet forwarding rules to maintain a chronological order of the multiple data changes from the primary site to the secondary site.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes software-defined networking-assisted I/O order preservation for data replication. At least one embodiment of the invention includes leveraging the software-defined networking (SDN) technique as a vehicle to preserve the order of I/O operations on a consistency group during asynchronous data replication.

Figure 1:
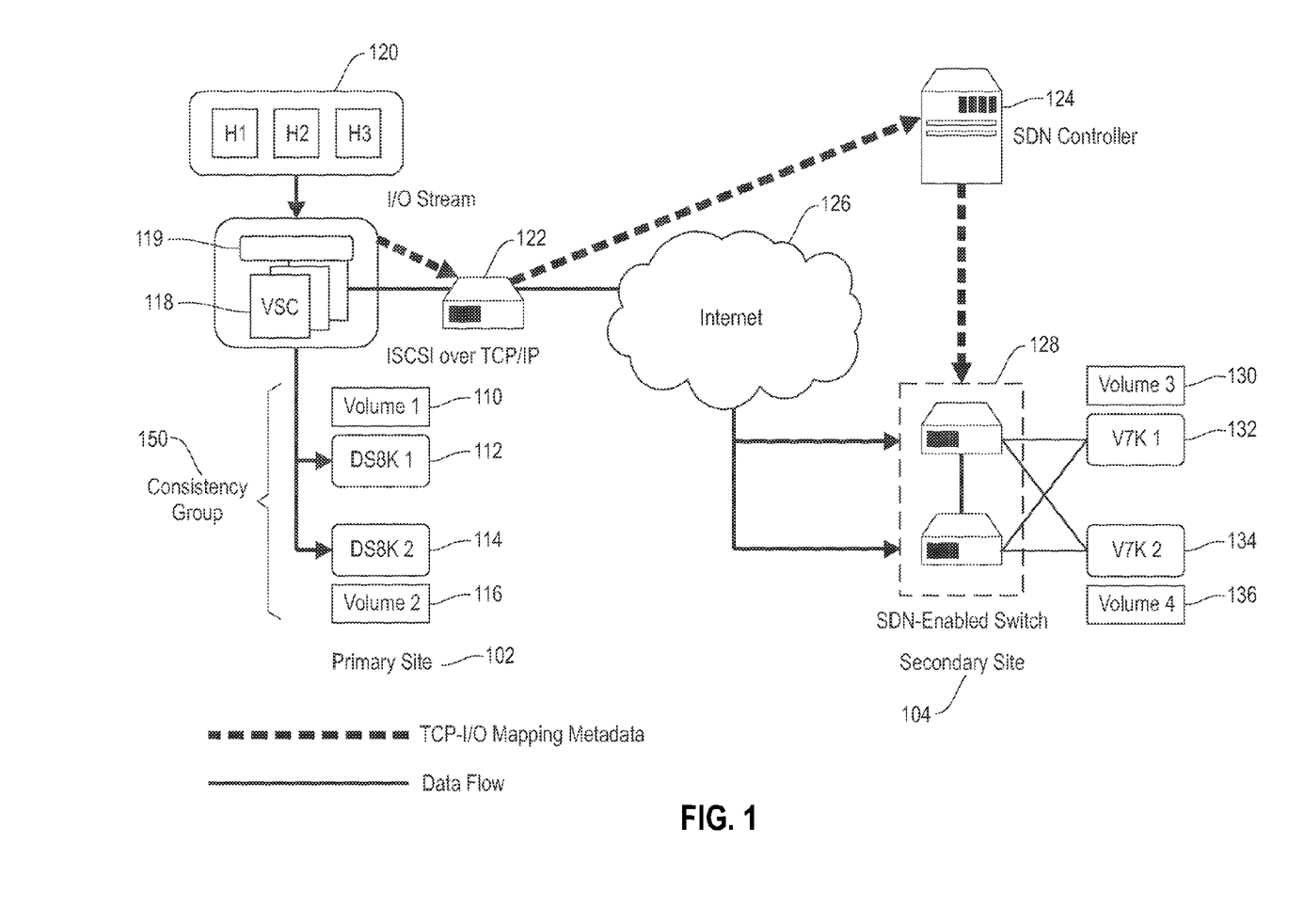
FIG. 1 is a diagram illustrating network-assisted I/O order preservation infrastructure, according to an embodiment of the invention.

FIG. 1 is a diagram illustrating network-assisted I/O order preservation infrastructure, according to an embodiment of the invention. By way of illustration, FIG. 1 depicts a primary data site 102 wherein the original copies of data are maintained, and all I/O requests from hosts 120 will be served on the primary site 102. For resiliency and continuity purposes, for example, the data changes occurring in the primary site 102 can be replicated to a secondary site 104 over a WAN such as the Internet 126 via TCP/IP based protocols (such as iSCSI and FCIP) via component 122 using an asynchronous replication strategy.

By way of example, in at least one embodiment of the invention, component 120 can represent a host, and/or a virtualized hypervisor which is hosting multiple virtual machines (denoted by H1, H2, H3 in FIG. 1), and wherein each virtual machine acts as a host and as disks (volumes) attached for application I/O usages.

Referring again to FIG. 1, certain applications require that both the data changes as well as the order of such changes be preserved in order to achieve application-level data consistency. By way of illustration, consider the example depicted in FIG. 1. A database application uses two volumes, volume 1 (component 110 in FIG. 1) and volume 2 (component 116 in FIG. 1), and a consistency group 150 is defined on both volumes. That is, the order of I/O changes to these two volumes must be preserved when applying data replication to the secondary site's 104 backup volumes (volume 3 (component 130) and volume 4 (component 136), as depicted in the FIG. 1 example).

A central virtualized storage controller (VSC) 118 (or a group of VSC nodes with one VSC designated as the master of the group) in the primary site 102 will measure all of the I/O performed on the consistency group 150 as well as the chronological order thereof. Additionally, the central VSC 118 will encapsulate the I/O commands, that is, data change commands and the set of data itself, into TCP/IP packets (depicted via component 122 in FIG. 1) using iSCSI or FCIP, and send the I/O commands in the corresponding I/O order to the secondary site devices.

By way of example, if the VSC 118 on the primary site 102 measures that I/O_1 (log write) arrives at volume 1 (log volume; component 110), followed by I/O_2 (data write) on volume 2 (data volume; component 116), wherein volume 1 and volume 2 belong to the same consistency group 150, the VSC node 118 will establish a TCP connection with a device (for example, V7K1 device 132 as depicted in FIG. 1) on the secondary site 104, which contains the replica volume of volume 1 (that is, volume 3 (component 130 in FIG. 1), also known as the replica of the log volume). The VSC node 118 will also send the iSCSI command (containing I/O_1) over a TCP/IP packet (for example, packet 1) to replicate the log write change.

Further, the VSC node 118 will establish another TCP connection with a device (for example, V7K2 device 134 as depicted in FIG. 1) on the secondary site 104, which contains the replica volume of volume 2 (that is, volume 4 (component 136 in FIG. 1), also known as the replica of the data volume). The VSC node 118 will also send the iSCSI command over another TCP/IP packet (for example, packet 2), which contains I/O_2 (data write operation) and replicate the packet to volume 4 (component 136). The VSC node 118 sends packet 1 first and packet 2 subsequently because the I/O operation contained in packet 1 occurs before the I/O operation contained in packet 2. However, due to the multipath routing behavior and the unreliable nature of the Internet 126, the two packets might arrive out of order (that is, packet 2 might arrive at V7K2 (component 134) before packet 1 arrives at V7K1 (component 132) per the above-noted example). Therefore, a replication of data write will occur on the secondary site 104 before a replication of log write, which violates the I/O order preservation requirement of the database application.

Accordingly, an aspect of the invention includes utilizing an SDN controller 124 to assist the I/O order preservation for asynchronous data replication across sites. In at least one embodiment of the invention, a software agent on the central device in the primary site 102 measures all I/O activities (data changes) and the order thereof on the consistency group of interest 150. In at least one embodiment of the invention, the software agent can be positioned inside of VSC 118 as a part of VSC 118 and/or as a separate module within VSC 118, such as depicted via module 119 in FIG. 1.

The agent will label the I/O activities on the consistency group 150 with I/O sequence numbers such as, for example, 1, 2, 3, etc., wherein a smaller number can indicate that the corresponding I/O operation occurs earlier than an I/O operation with a larger I/O sequence number. Additionally, the agent will record the corresponding TCP packet's sequence number with I/O operations contained therein. In other words, the agent can maintain the metadata in the form of <TCP_Seq_Num=x, I/O_Seq_Num=y>, which indicates that the packet with TCP_Seq_Num=x will complete I/O operation with I/O_Seq_Num=y.

Also, the agent will synchronize the metadata with the SDN controller 124 via a fast (possibly dedicated) link. The SDN controller 124 can interpret the metadata and initiate control commands to the SDN-enabled switches 128 to establish the rules that the TCP/IP packets containing later I/O operations must be kept in the buffer until all TCP/IP packets containing earlier I/O operations are delivered to the storage devices (devices 132 and 134, for example) in the secondary site 104.

Accordingly, at least one embodiment of the invention includes grouping and controlling multiple SDN-enabled switch and/or routing devices as a collective buffer, wherein TCP packets will be re-ordered according to their contained I/O operations' order to ensure that the I/O data changes arrive at the secondary site's storage devices in the exact same order as in the primary site.

Referring back to FIG. 1, assume that an application from a host requires that the order of all I/O operations on its two storage volumes (for example, volume 1 (component 110) and volume 2 (component 116)) must be preserved when applying asynchronous replications to the replicas on the secondary site 104. Therefore, the VSC node 118 on the primary site 102, which intercepts all I/O activities to the storage devices (such as devices 112 and 114 in FIG. 1), defines a consistency group 150 on volume 1 (component 110) and volume 2 (component 116) and keeps track of the order of I/O activities on these two volumes. In addition, the VSC node 118 will establish TCP/IP connections to the remote replica devices (such as devices 132 and 134 in FIG. 1) on the secondary site 104 and encapsulate I/O operations inside TCP/IP packets (via component 122) for delivery.

In at least one embodiment of the invention, SDN-assisted I/O order preservation can be implemented as follows. Assume that such an embodiment considers one VSC 118 on the primary site 102. It should be noted that utilization of one VSC is merely for purposes of describing an example embodiment of the invention, and extension to multiple VSC nodes can be accomplished, for example, by designating one of the VSC nodes as the master node which controls the synchronization with all other VSC nodes in the primary site.

As detailed herein, at least one embodiment of the invention includes installing a software agent 119 at the primary site 102, for example, with the VSC node 118, which records the I/O data changes (the I/O activities that should be replicated to the secondary site) to the consistency group 150 as well as the order thereof. The software agent 119 can label each I/O change with an index and/or sequence number to indicate the corresponding arrival order in time. By way of example, such labeled data might include the following:

| I/O | Volume | Timestamp | I/O Sequence Number (index) |
|---|---|---|---|
| write | volume1 | 19:15:30 pm | 100 |
| write | volume2 | 19:15:48 pm | 101 |
| write | volume1 | 19:35:10 pm | 102 |
| write | volume2 | 19:35:18 pm | 103 | wherein I/O with sequence numbers 100 and 102 will be replicated to volume 3, and I/O with sequence numbers of 101 and 103 will be replicated to volume 4, in the order of 100, 101, 102, and 103.

Figure 2:
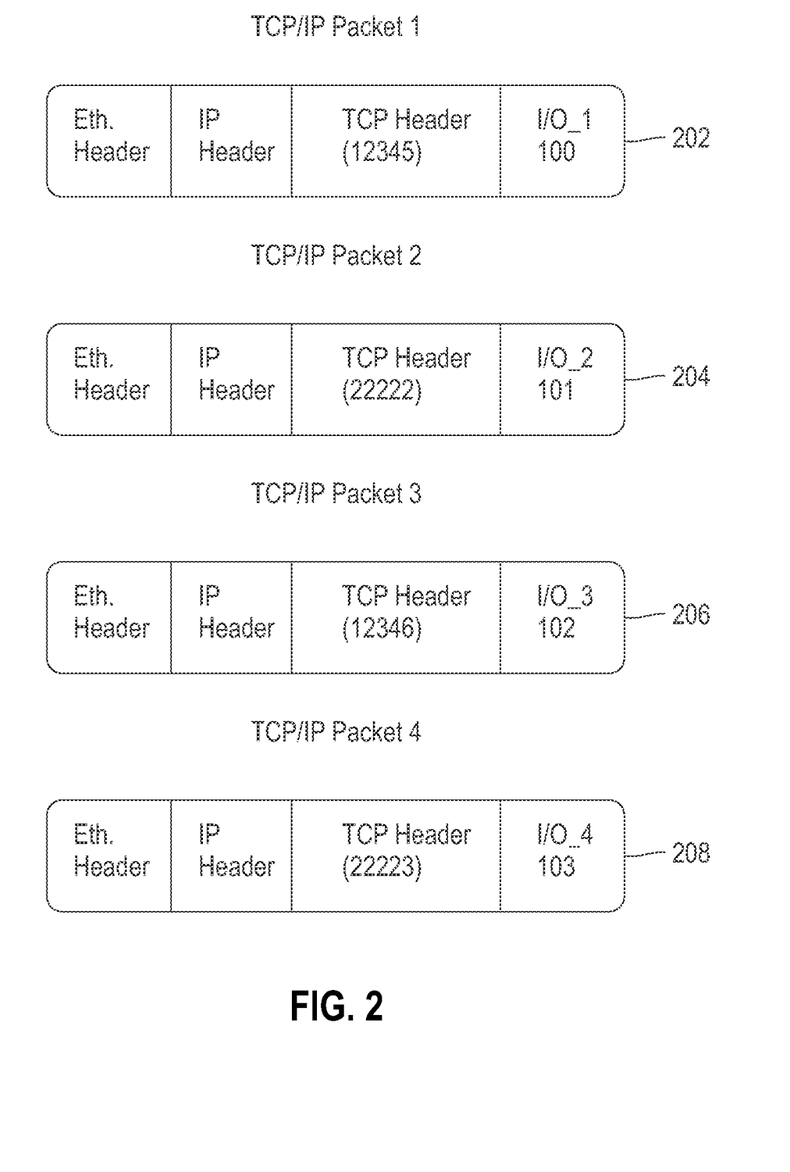
FIG. 2 is a diagram illustrating I/O encapsulation in TCP/IP packets, according to an embodiment of the invention.

Additionally, as also noted herein, in order to provide asynchronous data replication over the Internet 126, the VSC node 118 relies on TCP/IP based protocols (via component 122) to encapsulate the I/O commands. FIG. 2 is a diagram illustrating I/O encapsulation in TCP/IP packets, according to an embodiment of the invention. By way of illustration, FIG. 2 depicts TCP/IP Packet 1 (identified as component 202 in FIG. 2), TCP/IP Packet 2 (identified as component 204 in FIG. 2), TCP/IP Packet 3 (identified as component 206 in FIG. 2), and TCP/IP Packet 4 (identified as component 208 in FIG. 2). As shown in FIG. 2, the I/O operation 100 will be delivered in a TCP/IP packet or a series of packets, wherein the TCP protocol has a unique sequence number for each packet (such as illustrated, for example, in FIG. 3).

The software agent 119, as described above, will record the TCP sequence number of packets as well as the I/O sequence number inside of each packet, that is, the mapping information between the TCP sequence number and the sequence number of the I/O contained in the packet. In an example embodiment of the invention, the format of such metadata can include:

TCP_Seq_Num=12345, I/O_Seq_Num=100, to V7K1 (where volume 3 resides)
TCP_Seq_Num=22222, I/O_Seq_Num=101, to V7K2 (where volume 4 resides)
TCP_Seq_Num=12346, I/O_Seq_Num=102, to V7K1 (where volume 3 resides)
TCP_Seq_Num=22223, I/O_Seq_Num=103, to V7K2 (where volume 3 resides)

Note that for each TCP/IP connection, the starting sequence number can be different. Such self-incrementing TCP sequence numbers can be specified by the TCP protocol for flow control and packet re-delivery purposes. At least one embodiment of the invention includes associating this TCP sequence number with the I/O sequence number to obtain the metadata pertaining to the I/O operation contained in each TCP/IP packet. Also, the metadata (or mapping information in general) can be delivered to SDN controller 124, which implements SDN techniques to enable fine-control granularity on SDN-enabled devices according to each packet's attributes such as source address, destination address, port, protocol header value, etc. The delivery of such metadata can utilize, for example, a separate link, or can share the same data path wherein priority is configured at the outgoing SDN-enabled switch/routing devices, as compared to regular data traffic. Upon receiving the metadata, that is, the mapping between TCP sequence number and the contained I/O sequence number, the SDN controller 124 will send instructions to the collection of inbound SDN-enabled switch/routing devices 128 on the secondary site 104, as shown in FIG. 1. Packet forwarding rules can be established in such devices to ensure that the I/O operations on replicas will be applied according to the order that occurred in the primary site 102. Example packet forwarding rules might include the following:

1. Forward TCP/IP packets by inspecting each corresponding TCP sequence number, and deliver to the secondary site following the order of (12345 to V7K1, 22222 to V7K2, 12346 to V7K1, 22223 to V7K2, etc.); and
2. Re-order and hold "out of order packets" in the buffer until all prior packets on the list have been forwarded.

Note that if there are multiple inbound SDN-enabled switches/routers/devices 128, as shown in FIG. 1, the SDN controller 124 will inject rules to all devices and require the devices 128 to perform the packet forwarding rule collectively by synchronization. In other words, the set of SDN-enabled switches/routers/devices 128 (inbound to the secondary site) can be viewed as a collective buffer wherein TCP/IP packet re-ordering occurs according to rules specified by the SDN controller 124, and wherein such rules are, in turn, determined by the TCP/IP packets and I/O operation mapping information (that is, the metadata provided by the software agent 119 installed on the primary site).

Figure 3:
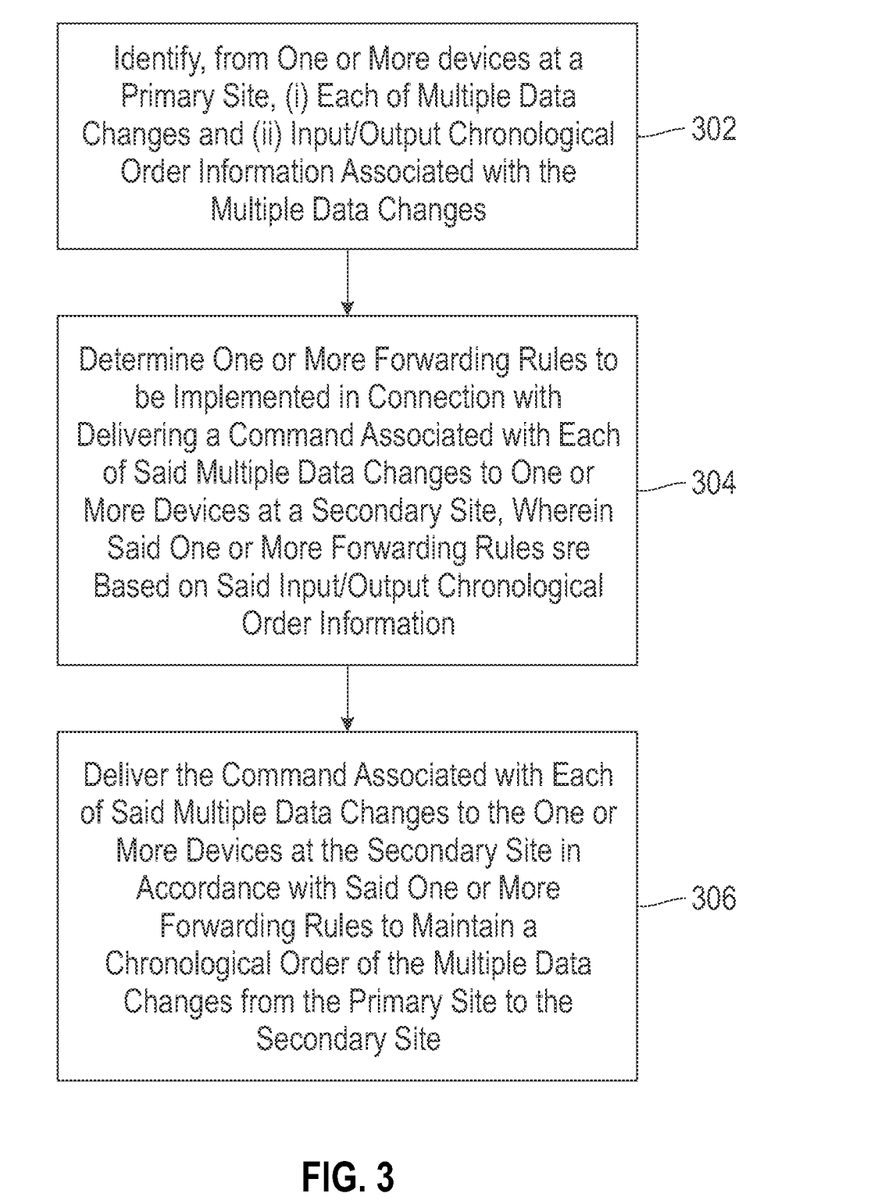
FIG. 3 is a flow diagram illustrating techniques according to an embodiment of the invention.

FIG. 3 is a flow diagram illustrating techniques according to an embodiment of the invention. Step 302 includes identifying, from one or more devices at a primary site, (i) each of multiple data changes and (ii) input/output chronological order information associated with the multiple data changes. As detailed herein, the multiple data changes can include input/output operation, and input/output chronological order information can include a transmission protocol packet sequence number for each of the multiple data changes.

Step 304 includes determining one or more forwarding rules to be implemented in connection with delivering a command associated with each of said multiple data changes to one or more devices at a secondary site, wherein said one or more forwarding rules are based on said input/output chronological order information.

Step 306 includes delivering the command associated with each of said multiple data changes to the one or more devices at the secondary site in accordance with said one or more forwarding rules to maintain a chronological order of the multiple data changes from the primary site to the secondary site. Delivery can include delivering the command associated with each of said multiple data changes to one or more devices at the secondary site during data replication (for example, asynchronous data replication) between the primary site and the secondary site. Additionally, delivery can include delivering the command associated with each of said multiple data changes to one or more devices at the secondary site over a wide area network (the Internet, for example). Further, delivery can include delivering the command associated with each of said multiple data changes to one or more devices at the secondary site via a transmission control protocol/internet protocol based protocol.

The techniques depicted in FIG. 3 can also include measuring (i) the multiple data changes and (ii) the input/output chronological order information associated with the multiple data changes for the one or more devices at the primary site. Additionally, at least one embodiment of the invention includes encapsulating (i) the multiple data changes and (ii) the input/output chronological order information associated with the multiple data changes into multiple data packets. In such an embodiment, the data packets can include multiple transmission control protocol/internet protocol packets.

As detailed herein, the techniques depicted in FIG. 3 can additionally include implementing software-defined networking techniques to the identified multiple data changes based on one or more attributes associated with the multiple data changes. The attributes can include, for example, source address, destination address, port and/or protocol header value.

At least one embodiment of the invention can also include techniques that include the steps of deploying a software agent at a primary site to collect information from one or more devices at the primary site, wherein said information comprises (i) each of multiple data changes and (ii) input/output chronological order information associated with the multiple data changes, and pushing said collected information as multiple data packets from said software agent to a software-defined networking controller. Such an embodiment also includes determining one or more data packet forwarding rules associated with the software-defined networking controller, wherein said one or more forwarding rules are based at least on said input/output chronological order information associated with the multiple data changes. Further, such an embodiment additionally includes transferring the multiple data packets from the software-defined networking controller to one or more software-defined networking-enabled routing components at a secondary site, and delivering the multiple data packets from the one or more software-defined networking-enabled routing components to one or more devices at the secondary site during data replication between the primary site and the secondary site in accordance with said one or more data packet forwarding rules to maintain a chronological order of the multiple data changes from the primary site to the secondary site.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
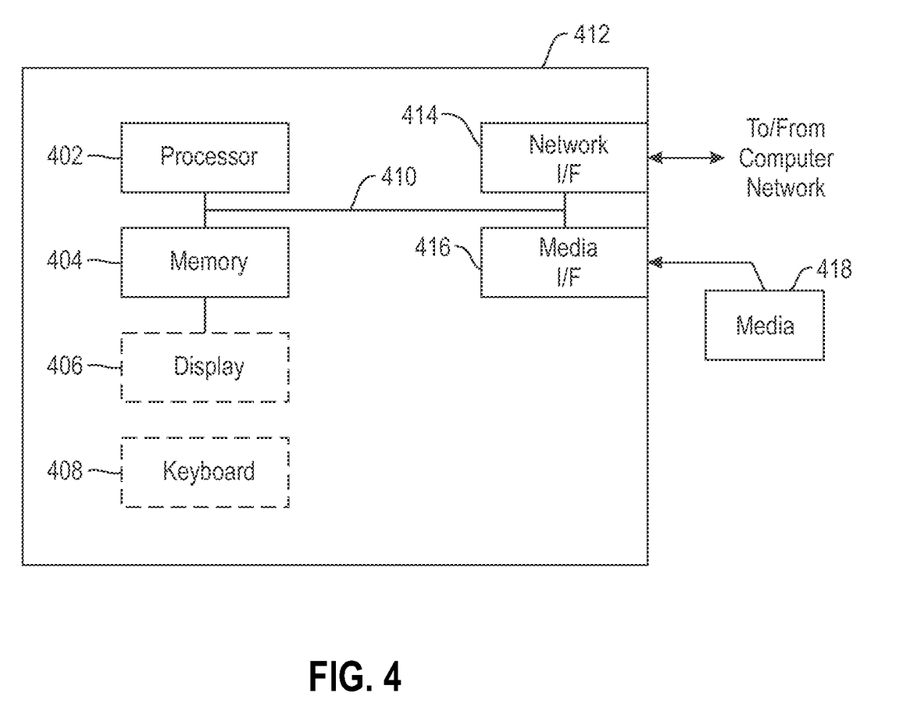
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, ensuring that I/O operations performed on a secondary site will be in the same order as in a primary site.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   deploying a software agent at a primary site to collect identifying, from one or more devices at the primary site, (i) each of multiple data changes and (ii) input/output chronological order information associated with the multiple data changes;
   pushing said collected information as multiple data packets from said software agent to a software-defined networking controller;
   determining one or more data packet forwarding rules associated with the software-defined networking controller, wherein said one or more forwarding rules are based on said input/output chronological order information;
   transferring the multiple data packets from the software-defined networking controller to one or more software-defined networking-enabled routing components at a secondary site; and
   delivering the multiple data packets from the one or more software-defined networking-enabled routing components to one or more devices at the secondary site during data replication between the primary site and the secondary site in accordance with said one or more data packet forwarding rules to maintain a chronological order of the multiple data changes from the primary site to the secondary site;
   wherein said deploying, said pushing, said determining, said transferring, and said delivering is carried out by at least one computing device.

2. The method of claim 1, wherein said input/output chronological order information comprises a transmission protocol packet sequence number for each of the multiple data changes.

3. The method of claim 1, wherein each of said multiple data changes comprises an input/output operation.

4. The method of claim 1, wherein said data replication comprises asynchronous data replication.

5. The method of claim 1, wherein said delivering comprises delivering the multiple data packets from the one or more software-defined networking-enabled routing components to one or more devices at the secondary site over a wide area network.

6. The method of claim 5, wherein said wide area network comprises the Internet.

7. The method of claim 1, wherein said delivering comprises delivering the multiple data packets from the one or more software-defined networking-enabled routing components to one or more devices at the secondary site via a transmission control protocol/internet protocol based protocol.

8. The method of claim 1, comprising:
measuring (i) the multiple data changes and (ii) the input/output chronological order information associated with the multiple data changes for the one or more devices at the primary site.

9. The method of 1, comprising:
encapsulating (i) the multiple data changes and (ii) the input/output chronological order information associated with the multiple data changes into multiple data packets.

10. The method of claim 9, wherein said multiple data packets comprise multiple transmission control protocol/internet protocol packets.

11. The method of claim 1, comprising:
implementing software-defined networking techniques to the multiple data changes based on one or more attributes associated with the multiple data changes.

12. The method of claim 11, wherein said one or more attributes comprise source address, destination address, port and/or protocol header value.

13. A computer program product, the computer program product comprising a computer readable storage medium having program instructions embodied therewith, the program instructions executable by a computing device to cause the computing device to:
deploy a software agent at a primary site to collect, from one or more devices at the primary site, (i) each of multiple data changes and (ii) input/output chronological order information associated with the multiple data changes;
push said collected information as multiple data packets from said software agent to a software-defined networking controller;
determine one or more data packet forwarding rules associated with the software-defined networking controller, wherein said one or more forwarding rules are based on said input/output chronological order information;
transfer the multiple data packets from the software-defined networking controller to one or more software-defined networking-enabled routing components at a secondary site; and
deliver the multiple data packets from the one or more software-defined networking-enabled routing components to one or more devices at the secondary site during data replication between the primary site and the secondary site in accordance with said one or more data packet forwarding rules to maintain a chronological order of the multiple data changes from the primary site to the secondary site.

14. The computer program product of claim 13, wherein said input/output chronological order information comprises a transmission protocol packet sequence number for each of the multiple data changes.

15. The computer program product of claim 13, wherein the multiple data packets from the one or more software-defined networking-enabled routing components is delivered to one or more devices at the secondary site over a wide area network.

16. The computer program product of claim 13, wherein (i) the multiple data changes and (ii) the input/output chronological order information associated with the multiple data changes are encapsulated into multiple data packets.

17. A system comprising:
a memory; and
at least one processor coupled to the memory and configured for:
deploying a software agent at a primary site to collect, from one or more devices at the primary site, (i) each of multiple data changes and (ii) input/output chronological order information associated with the multiple data changes;
pushing said collected information as multiple data packets from said software agent to a software-defined networking controller;
determining one or more data packet forwarding rules associated with the software-defined networking controller, wherein said one or more forwarding rules are based on said input/output chronological order information;
transferring the multiple data packets from the software-defined networking controller to one or more software-defined networking-enabled routing components at a secondary site; and
delivering the multiple data packets from the one or more software-defined networking-enabled routing components to one or more devices at the secondary site during data replication between the primary site and the secondary site in accordance with said one or more data packet forwarding rules to maintain a chronological order of the multiple data changes from the primary site to the secondary site.

* * * * *